United States Patent
Bhalerao

(10) Patent No.: US 10,049,023 B1
(45) Date of Patent: Aug. 14, 2018

(54) OPTIMIZING APPLICATION RECOVERY IN UNMANAGED CLUSTERS

(71) Applicant: Veritas Technologies LLC, Mountain View, CA (US)

(72) Inventor: Anand J. Bhalerao, Maharashtra (IN)

(73) Assignee: Veritas Technologies LLC, Mountain View, CA (US)

( * ) Notice: Subject to any disclaimer, the term of this patent is extended or adjusted under 35 U.S.C. 154(b) by 34 days.

(21) Appl. No.: 14/977,031

(22) Filed: Dec. 21, 2015

Related U.S. Application Data

(60) Provisional application No. 62/104,046, filed on Jan. 15, 2015, provisional application No. 62/188,730, filed on Jul. 5, 2015.

(51) Int. Cl.
| | | |
|---|---|---|
| *G06F 11/00* | (2006.01) | |
| *G06F 11/20* | (2006.01) | |
| *H04L 12/24* | (2006.01) | |

(52) U.S. Cl.
CPC ...... *G06F 11/2033* (2013.01); *H04L 41/5009* (2013.01); *G06F 2201/805* (2013.01); *G06F 2201/85* (2013.01)

(58) Field of Classification Search
USPC ..................................................... 714/4.11
See application file for complete search history.

(56) References Cited

U.S. PATENT DOCUMENTS

| | | | | |
|---|---|---|---|---|
| 5,530,802 | A * | 6/1996 | Fuchs | G06F 11/1438 714/17 |
| 6,385,715 | B1 * | 5/2002 | Merchant | G06F 9/383 712/218 |
| 6,732,123 | B1 * | 5/2004 | Moore | G06F 11/1471 |
| 6,799,189 | B2 * | 9/2004 | Huxoll | G06F 11/1471 |
| 7,447,710 | B2 * | 11/2008 | Sampath | G06F 11/1471 |
| 7,664,991 | B1 * | 2/2010 | Gunda | G06F 11/1443 714/43 |
| 7,707,451 | B2 * | 4/2010 | Buskens | G06F 9/5066 706/19 |
| 9,274,903 | B1 * | 3/2016 | Garlapati | G06F 11/2002 |
| 9,323,636 | B2 * | 4/2016 | Xia | G06F 11/004 |

* cited by examiner

*Primary Examiner* — Amine Riad
(74) *Attorney, Agent, or Firm* — Campbell Stephenson LLP

(57) ABSTRACT

Various systems, methods, and processes to perform recovery operations in a cluster based on exponential backoff models are disclosed. A node failure is detected. The node is one of multiple nodes in a cluster. In response to the node failure, an application executing on the node is failed over to another node in the cluster. In response to the detecting the node failure, recovery operations are automatically performed to determine whether the node is recovered. A subsequent recovery operation is performed after a prior recovery operation. The subsequent recovery operation is performed periodically based on a frequency that decreases exponentially after performing the prior recovery operation.

20 Claims, 11 Drawing Sheets

| Service Level Agreement Table 305 | | | | | |
|---|---|---|---|---|---|
| Node Group 310 | Nodes 315 | MTTR 320 | ACRT 325 | Elapsed Time 330 | Total Elapsed Time 335 |
| 310(1) | 110(1)<br>110(2)<br>110(3) | 24 hours | 1 hour | > 24 hours<br>< 72 hours | 72 hours |
| 310(2) | 110(2)<br>110(3)<br>110(4) | 4 hours | 10 minutes | > 4 hours<br>< 12 hours | 12 hours |
| ... | ... | ... | ... | | ... |
| 310(N) | 110(1)<br>110(2)<br>110(3)<br>110(4) | 30 minutes | 5 minutes | > 30 minutes<br>< 1 hour | 1 hour |

OPTIMIZING APPLICATION RECOVERY IN UNMANAGED CLUSTERS

RELATED APPLICATIONS

This application claims the benefit under 35 U.S.C. § 119(e) of U.S. Provisional Patent Application No. 62/104,046 filed on Jan. 15, 2015, entitled "Management of and Data Recovery for Virtual Data Processing Systems," and U.S. Provisional Patent Application No. 62/188,730 filed on Jul. 5, 2015, entitled "Management of and Data Recovery for Virtual Data Processing Systems," both of which are hereby incorporated by reference herein in their entirety.

FIELD OF THE DISCLOSURE

The present disclosure relates to application recovery in multi-node clusters. In particular, this disclosure relates to optimizing application recovery in unmanaged clusters.

DESCRIPTION OF THE RELATED ART

A cluster is a distributed computer system with several nodes (e.g., computing devices) that work together as a single entity to provide processing power and storage resources. In a cluster, the processing load of the computer system is typically spread over more than one computer (or node), thereby eliminating (or minimizing) single points of failure. Therefore, applications and/or programs executing on the cluster can continue to function despite a problem with one computer (or node) in the cluster.

When a node in a cluster experiences some type of failure (e.g., a hardware failure, loss of storage connectivity, and the like), an application executing on that node is failed over (or moved) to another node in the cluster. Software implemented to manage the cluster (e.g., cluster management software) then performs one or more recovery operations to determine whether the failed node is operational (and/or recovered) so that the node can be designated as a failover target for the application (e.g., the application can start executing on the node, once that node is recovered and is operational).

However, performing such recovery operations can be resource intensive. For example, performing one (or more) recovery operations to determine whether a failed node has recovered and is operational can consume significant computing (e.g., network bandwidth and the like) and memory resources. In unmanaged (or remote) clusters (e.g., clusters where human intervention to recover (or fix) a failed node is not possible, or would, at the very least, take a considerable amount of time), performing such recovery operations can consume (and waste) significant computing and memory resources of the cluster.

SUMMARY OF THE DISCLOSURE

Disclosed herein are systems, processes, and methods to optimize application recovery in unmanaged or minimally managed clusters. One such method involves detecting a node failure. The node is one of multiple nodes in a cluster. In response to the node failure, an application executing on the node is failed over to another node in the cluster. In response to the detecting the node failure, the method automatically performs recovery operations to determine whether the node is recovered. A subsequent recovery operation is performed after a prior recovery operation. The method performs the subsequent recovery operation periodically based on a frequency that decreases exponentially after performing the prior recovery operation.

In some embodiments, a time period between each recovery operation increases exponentially after an elapsed time reaches a mean time to recovery (MTTR). The recovery operations are performed based on an auto-clear retry threshold (ACRT) until the elapsed time is equal to the MTTR. In other embodiments, the MTTR and the ACRT are received as part of one or more user inputs, or as part of one or more Service Level Agreements (SLAs). The MTTR includes information indicating a mean time required to recover the node failure such that the node can be designated as a failover target for the application. The ACRT includes information indicating a specific minimum frequency at which each recovery operation of the plurality of recovery operations is to be performed until the elapsed time is equal to the MTTR.

In certain embodiments, the cluster is an unmanaged or remote cluster. The MTTR is based on one or more characteristics of the cluster including a geographic location of the cluster, the complexity of an application being managed, or a size of the cluster.

The foregoing is a summary and thus contains, by necessity, simplifications, generalizations and omissions of detail; consequently those skilled in the art will appreciate that the summary is illustrative only and is not intended to be in any limiting. Other aspects, features, and advantages of the present disclosure, as defined solely by the claims, will become apparent in the non-limiting detailed description set forth below.

BRIEF DESCRIPTION OF THE DRAWINGS

The present disclosure may be better understood, and its numerous objects, features and advantages made apparent to those skilled in the art by referencing the accompanying drawings.

Figure 1A:
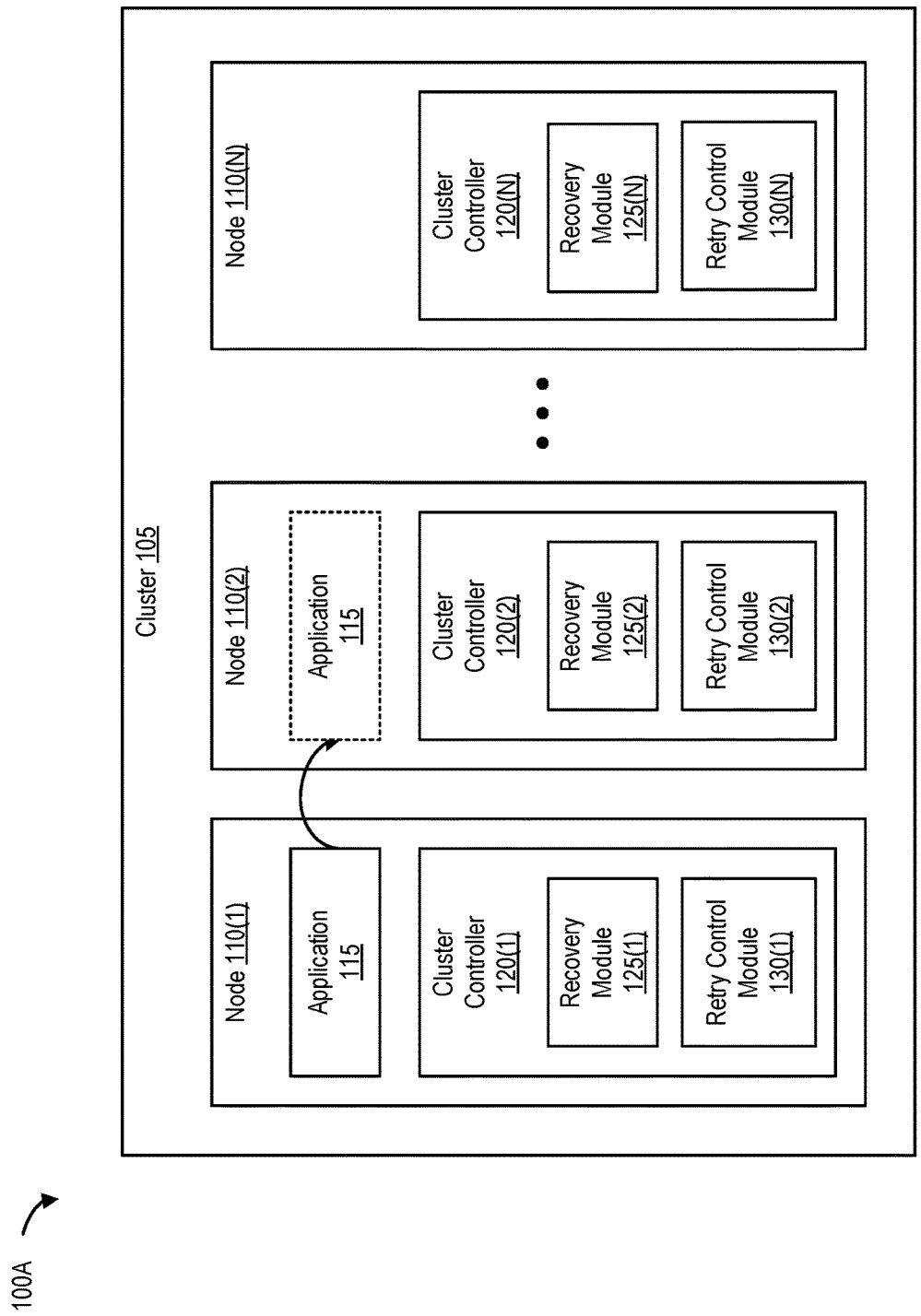
FIG. 1A is a block diagram of a cluster implementing a recovery module, according to one embodiment of the present disclosure.

While the disclosure is susceptible to various modifications and alternative forms, specific embodiments of the disclosure are provided as examples in the drawings and detailed description. It should be understood that the drawings and detailed description are not intended to limit the disclosure to the particular form disclosed. Instead, the intention is to cover all modifications, equivalents and alternatives falling within the spirit and scope of the disclosure as defined by the appended claims.

DETAILED DESCRIPTION

Introduction

One or more nodes that are part of a cluster can fail for a variety of reasons. For example, a node (e.g., a computing device) in cluster can experience a hardware failure, a software failure, loss of storage connectivity, loss of network connectivity, and the like. When a node fails in a cluster, one or more applications executing on that node are typically failed over (or moved) to one or more other nodes in the cluster. In this manner, applications executing on the cluster can continue to function despite a problem with one particular node in the cluster.

Companies and organizations typically use cluster management software to manage and implement application failover and recovery operations in a cluster. After an application has been failed over from a failed node (e.g., to another node), the cluster management software performs one or more recovery operations to determine whether the failed node is recovered and is operational. If recovered and operational, the node can be designated as a failover target and can continue to execute the application(s).

Recovering a failed node can require human intervention. For example, a network administrator or an information technology (IT) professional may have to troubleshoot and rectify the failed node to render the failed node operational. However, until the network administrator or IT professional has an opportunity to rectify the failed node, the cluster management software performs one or more recovery operations to determine whether the failed node is recovered and is operational.

As noted above, performing such recovery operations can be resource intensive in terms of consuming computing and memory resources of the cluster. In managed clusters (e.g., clusters that have a dedicated administrator and/or IT professional), a failed node can be attended to within a reasonable amount of time and the node failure can be subsequently rectified as a result of the human intervention. Therefore, the consumption of computing and memory resources of the cluster to perform recovery operations can potentially be minimal and/or insignificant.

Unfortunately, unmanaged or remote clusters may not have a dedicated administrator and/or IT professional who can attend to (and rectify) a failed node within a reasonable amount of time. For example, human intervention to recover failed node(s) in a cluster can be hampered by the scale of the data center that the cluster is part of (e.g., a large number of clusters with hundreds if not thousands of computing devices), lack of access to the cluster (e.g., a cluster in a remote geographic area that makes human access difficult and/or impossible), and/or the complexity of application dependencies associated with application(s) that execute on the cluster.

Therefore, in unmanaged clusters, where human intervention to identify, troubleshoot, and rectify one or more failed nodes is not forthcoming and/or is impossible, recovery operations performed periodically in fixed intervals of time (or fixed time periods) can consume significant computing (e.g., network bandwidth and the like) and memory resources of the cluster. In addition, such recovery operations may also prove to be redundant.

Disclosed herein are methods, systems, and processes to optimize application recovery in unmanaged clusters while potentially conserving costly computing and memory resources of the unmanaged cluster.

Examples of Performing Recovery Operations in Unmanaged Clusters

FIG. 1A is a block diagram of a cluster, according to one embodiment. Cluster 105 includes several nodes (e.g., nodes 110(1)-(N)). Nodes 110(1)-(N) can be any type of computing device including a server, a desktop, a laptop, a tablet, and the like. Cluster 105 also executes application 115. As shown in FIG. 1A, node 110(1) executes application 115. However, if node 110(1) fails for any reason, application 115 is failed over (or moved) to node 110(2).

Each node in cluster 105 implements a cluster controller. For example, node 110(2) (to which application 115 is failed over upon the failure of node 110(1), as shown in FIG. 1A), implements cluster controller 120(2). Cluster controller 120(2) manages application failover and recovery operations for cluster 105. Because each node in cluster 105 implements a cluster controller, each operational (and/or active) node in cluster 105 can manage application failover and recovery operations for cluster 105. As shown in FIG. 1A, cluster controller 120(2) also includes a recovery module (e.g., recovery module 125(2)), and a retry control module (e.g., retry control module 130(2)).

Recovery module 125(2) performs one or more recovery operations, for example, to determine whether node 110(1) is recovered and/or operational. Retry control module 130(2) determines if and when one or more recovery operations should be initiated by recovery module 125(2). In addition, retry control module 130(2) also determines (and controls) the number of times a recovery operation should be performed by recovery module 125(2), and a frequency of one or more recovery operations to be performed by recovery module 125(2). Like the cluster controller described above, any active and/or operational node in cluster 105 can implement a recovery module and a retry control module to manage and execute recovery operations. For example, as shown in FIG. 1A, node 110(N) includes cluster controller 120(N), recovery module 125(N), and retry control module 130(N).

Figure 1B:
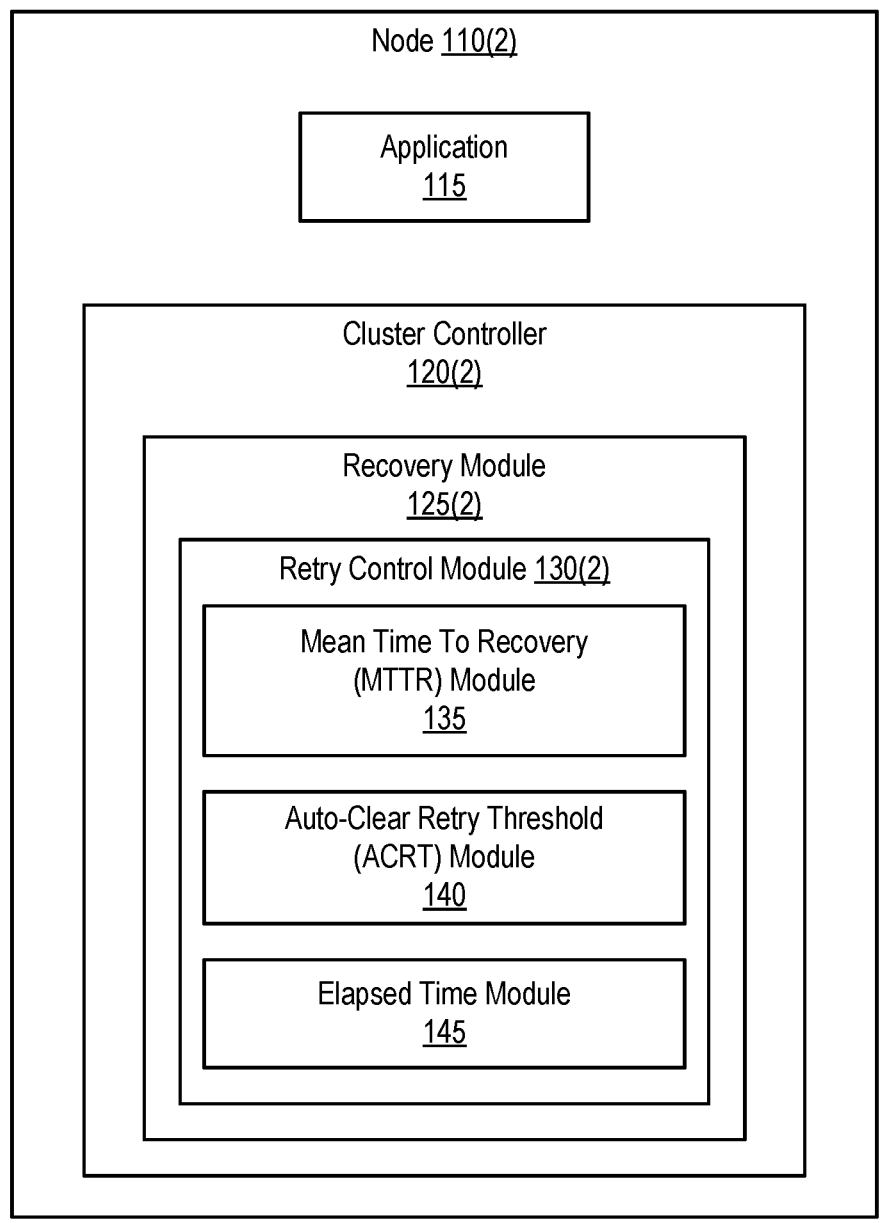
FIG. 1B is a block diagram of a node implementing a recovery module, according to one embodiment of the present disclosure.

FIG. 1B is a block diagram of a node that implements a recovery module, according to one embodiment. As shown in FIG. 1B, node 110(2) executes application 115, which in this example, has been failed over from node 110(1) (e.g., because node 110(1) has failed for some reason, and thus, is not active and/or operational). Node 110(2) implements cluster controller 120(2). Cluster controller 120(2) can control recovery operations performed by one or more nodes in cluster 105, including the node on which cluster controller 120(2) is implemented (e.g., node 110(2)).

Cluster controller 120(2) implements recovery module 125(2). As previously noted, recovery module 125(2) performs one or more recovery operations to determine whether a particular node in cluster 105 has recovered from a failure, and is therefore operational and/or active (e.g., to be designated as a failover target). Although retry control module 130(2) can be implemented separately by cluster controller 120(2) (e.g., as shown in FIG. 1A), in some embodiments, retry control module 130(2) can also be implemented by recovery module 125(2) (e.g., as shown in FIG. 1B).

Retry control module 130(2) determines if and when one or more recovery operations should be initiated by recovery module 125(2). In addition, retry control module 130(2) also determines (and controls) the number of times a recovery operation should be performed by recovery module 125(2), and a frequency of one or more recovery operations to be performed by recovery module 125(2). To accomplish these functions, retry control module 130(2) implements a mean time to recovery (MTTR) module (e.g., MTTR module 135), an auto-clear retry threshold (ACRT) module (e.g., ACRT module 140), and an elapsed time module (e.g., elapsed time module 145).

Figure 1C:
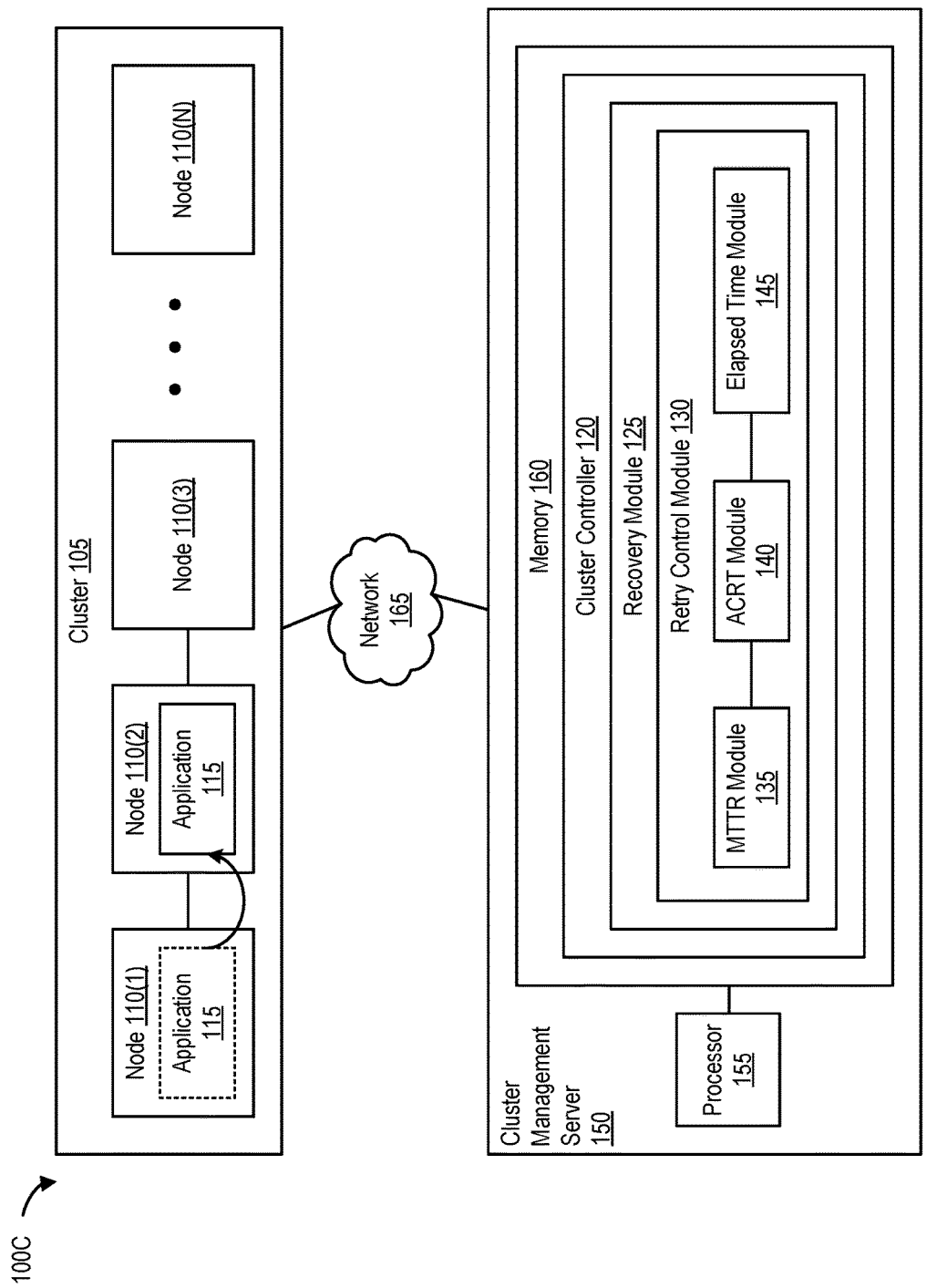
FIG. 1C is a block diagram of a cluster management server implementing a recovery module, according to one embodiment of the present disclosure.

FIG. 1C is a block diagram of a cluster management server, according to one embodiment. In this example, cluster 105 includes nodes 110(1)-(N), and application 115 that executes in cluster 105 (e.g., on one or more of nodes 110(1)-N)). As shown in FIG. 1C, application 115 is failed over from node 110(1) to node 110(2) (e.g., because of the failure of node 110(1)). It should be noted that application 115 can be failed over to any other node in cluster 105, other than node 110(2).

It will be appreciated that a cluster controller can be implemented by a cluster management server. In this example, cluster management server 150 is communicatively coupled to cluster 105 via network 165, and implements cluster controller 120. Cluster management server 150 performs one or more recovery operations, and can be any of a variety of different types of computing devices, including a server, personal computing device, laptop computer, cellular phone, or the like. Network 165 can be any type of one or more networks and/or interconnections such as the Internet, a Local Area Network (LAN), and/or a Storage Area Network (SAN).

As shown in FIG. 1C, cluster management server 150 includes processor 155 and memory 160. Memory 160 implements cluster controller 120. Cluster controller 120 further implements recovery module 125. Recovery module 125 performs one or more recovery operations to determine whether a particular node in cluster 105 has recovered from a failure (e.g., node 110(1)), and is therefore operational and/or active (e.g., to be designated as a failover target). Recovery module 125 further implements retry control module 130.

Retry control module 130 includes at least three modules: MTTR module 135, ACRT module 140, and elapsed time module 145. MTTR module 135 receives, stores, and maintains information indicating a mean time required to recover a particular node that has failed. In some embodiments, MTTR module 135 can also determine the mean time required to recover a failed node (e.g., based on system performance, historical information, and the like).

The mean time required to recover a particular failed node in a cluster can be based on a variety of factors. For example, the mean time required to recover a failed node may depend on the scale of the cluster (e.g., the size of the cluster and the number of computing devices in the cluster), and/or the complexity of the cluster (e.g., application dependencies between the various nodes in the cluster). Therefore, a failed node in a large and/or complex cluster can experience a higher mean time to recovery than a failed node in a smaller and/or less complex cluster.

In unmanaged, minimally managed, and/or remote clusters, the mean time to recover a failed node can be particularly high. For example, cluster 105 can be a minimally managed cluster where only node failures of a certain level of criticality are managed, or where manual/human intervention takes a certain amount of time (e.g., to send a person to a remote location for manual repair). In this scenario, the mean time to recovery can be based on the mean time it takes for an administrator and/or IT professional to travel to the unmanaged and/or remote cluster (e.g., to a data center in a remote geographic location), and identify and troubleshoot the failed node(s). For example, a company and/or organization may have access to information indicating the time it took to recover node 110(1) on each of three previous occasions of failure of node 110(1). Based on this information, an administrator and/or IT professional of the company and/or organization can submit a mean time to recover node 110(1) in the form of a user input. MTTR module 135 can store and use this mean time to recover node 110(1) (e.g., in the form of the user input) to perform future recovery operations.

In some embodiments, the mean time to recover a particular node can also be based on one or more characteristics of the node (or the cluster) itself. For example, a node implemented in a cluster with a complex hardware and/or software configuration would likely require a higher mean time to recover than a node implemented in a cluster with a less complex software and/or hardware configuration. Therefore, depending on the complexity and the size of a particular cluster, MTTR module 135 can automatically determine the mean time required to recover a particular node in that cluster.

In one embodiment, and as noted above, MTTR module 135 can receive the mean time to recover a particular node (e.g., node 110(1)) based on a user input. If cluster 105 is an unmanaged and/or remote cluster, the mean time to recover node 110(1) can be, for example, twenty four hours (versus if cluster 105 is a managed cluster, where an administrator and/or IT professional can likely rectify the failure (of the node) within, for example, four hours). MTTR module 135 stores this mean time to recovery to initiate, manage, and perform recovery operations to determine whether node 110(1) has recovered and is operational and/or active.

In other embodiments, MTTR module 135 can automatically determine a mean time to recover a particular node in a cluster based on historical information. For example, MTTR module 135 can store the time it took to recover a particular (failed) node on "n" number of previous occasions. The next time this particular node fails, MTTR module 135 can compare the time to took to recover this node on the "n" number of previous occasions and calculate a mean time (or average time) to recover the node. For example, if node 110(1) failed on three previous occasions and it took an administrator and/or IT professional two hours, four hours, and six hours, respectively to recover node 110(1) on those three previous occasions, MTTR module 135 can calculate the mean (or average) time to recover node 110(1) by averaging the time it took to recover 110(1) on those three previous occasions (e.g., four hours). MTTR module 135 can then use this mean time to recovery of four hours to perform recovery operations next time node 110(1) fails (for any reason).

As shown in FIG. 1C, retry control module 130 also implements ACRT module 140 and elapsed time module 145. ACRT module 140 receives, stores, manages, and/or determines an auto-clear retry threshold. Elapsed time module 145 calculates and tracks the amount of time that has elapsed since a particular node has failed. In one embodiment, the auto-clear retry threshold refers to information indicating a specific minimum frequency at which one or more recovery operations are to be performed. The auto-clear retry threshold can be received via a user input (e.g., from an administrator). For example, the auto-clear retry threshold can be set (or determined) by an administrator and communicated to cluster controller 120 (e.g., via a user input, or through some other means). In this example, the specific minimum frequency indicates (and refers to) a fixed frequency to perform recovery operations.

However, in some embodiments, instead of performing recovery operations based on the auto-clear retry threshold (e.g., the specific minimum frequency) for the entire duration of the node failure, recovery module 125 only performs recovery operations based on the specific minimum frequency as indicated by the auto-clear retry threshold until the elapsed time is equal to the mean time to recovery (e.g., of a particular node).

Like the mean time to recovery, auto-clear retry threshold can also be based on the importance of a node (e.g., if a particular node is required to execute a business critical application, and the like). For example, if a failed node is particular important for the cluster's operability, the specific minimum frequency for the auto-clear retry threshold can be lower (e.g., retry control module 130 will perform a recovery operation on node 110(1) every ten minutes until the elapsed time since node 110(1) has failed equals (or approaches) a mean time required to recovery node 110(1)).

Therefore, although a pre-determined (and/or set) value for the mean time to recovery and the auto-clear retry threshold can be received by recovery module 125 in the form of one (or more) user inputs, retry control module 130 can update, change, and/or modify the value of the mean time to recovery and the auto-clear retry threshold based on one or more factors that include, but are not limited to: a scale of the cluster, the size of the cluster, the geographic location of the cluster, the remoteness of the cluster, whether the cluster is managed or unmanaged, the complexity of the cluster's hardware and software configuration, the importance of particular nodes and/or applications executing in the cluster, complexity of application dependencies, historical information of previous node failures, and the like.

Figure 2:
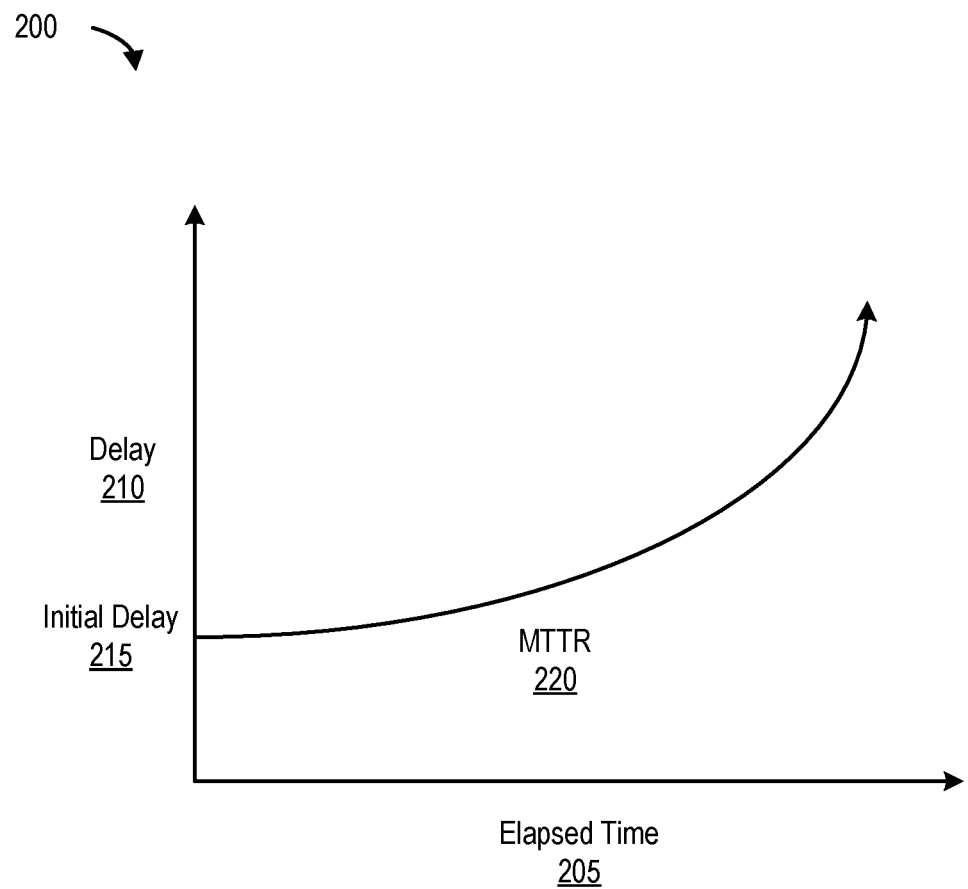
FIG. 2 is a graph that illustrates an exponential backoff model for performing recovery operations, according to one embodiment of the present disclosure.

FIG. 2 is a graph that illustrates an exponential backoff model for performing recovery operations, according to one embodiment. Recovery module 125 performs one or more recovery operations after an initial delay 215. For example, a node may experience a transient failure (e.g., a minor network interference). Therefore, this node may remain failed for an insignificant or small period of time as the network interference may be automatically rectified, for example, after two minutes. Elapsed time 205 refers to the time that has passed since a particular node has failed (or is determined to have failed, for example, by recovery module 125).

As previously noted, recovery module 125 does not perform recovery operations based on the specific minimum frequency indicated by the auto-clear retry threshold for the entire duration of node failure. Instead, recovery module 125 (e.g., using ACRT module 140) performs recovery operations on a particular failed node based on the specific minimum frequency indicated by the auto-clear retry threshold only until the elapsed time (e.g., elapsed time 205) equals (or approaches) the mean time (required) to recover that particular failed node (e.g., MTTR 220).

For example, cluster controller 120 detects the failure of node 110(1). In response to the failure of node 110(1), cluster controller 120 fails over application 115 from node 110(1) to node 110(2) (as shown in FIG. 1C). Recovery module 125 then automatically performs recovery operations to determine whether node 110(1) is recovered. For example, retry control module 130 uses ACRT module and elapsed time module 145 to automatically perform recovery operations based on a specific minimum frequency as indicated by the auto-clear retry threshold. Once one or more recovery operations have been initiated based on the auto-clear retry threshold, (e.g., after initial delay 215), or before the initiation of the one or more recovery operations based on the auto-clear retry threshold, retry control module 130 accesses elapsed time module 145 and MTTR module 135 to determine whether elapsed time 205 is equal to MTTR 220. If retry control module 130 determines that elapsed time 205 is equal to MTTR 220, retry control module 130 instructs recovery module 125 to perform all subsequent recovery operations based on an exponential backoff frequency. For example, once retry control module 130 determines that elapsed time 205 is equal to MTTR 220, retry control module 130 instructs recovery module 125 to perform a subsequent recovery operation periodically based on a frequency that decreases exponentially after performance of a prior recovery operation.

Figure 3:
FIG. 3 is a table that illustrates a Service Level Agreement (SLA), according to one embodiment of the present disclosure.

FIG. 3 is a table that illustrates a Service Level Agreement (SLA), according to one embodiment. As noted, one or more values for the mean time to recovery and the auto-clear retry threshold associated with a particular node can be received via one or more user inputs, and/or can be calculated, determined, and/or updated/modified by MTTR module 135 and ACRT module 140 respectively (e.g., based on one or more factors and/or characteristics of the node in question (e.g., a failed node), the cluster, and the like).

However, in some embodiments, one or more values for the mean time to recovery and the auto-clear retry threshold associated with a particular node can be retrieved by retry control module 130 by accessing an SLA. An example of one such SLA is shown in FIG. 3. Retry control module 130, recovery module 125, and/or cluster controller 120 can access SLA 305 and retrieve information in SLA 305 to perform recovery operations. As shown in SLA 305, node group 310(1) includes nodes 110(1), 110(2), and 110(3). MTTR 320 indicated in SLA 305 with respect to node group 310(1) is twenty four hours. In this example, the MTTR of twenty four hours indicates that each of nodes 110(1), 110(2), and/or 110(3) would take an average of twenty four hours to recover, if and when they experience a failure.

SLA 305 indicates an ACRT 325 for node group 301(1) of one hour. The ACRT of one hour indicates that retry control module 130 must perform recovery operations on a failed node in node group 301 (e.g., either node 110(1), 110(2), and/or 110(3)) every hour. Therefore, recovery module 125 performs recovery operations on one or more of nodes 110(1), 110(2), and/or 110(3) (if they have failed) based on the specific minimum frequency of one hour as indicated by ACRT 325 as it applies to node group 301(1). However, recovery module 125 only performs recovery operations on these nodes every hour until the elapsed time (e.g., elapsed time 330) is equal to the MTTR of twenty four hours. If a failed node in node group 301(1) remains failed (e.g., non-operational) for twenty hour hours, recovery module 125 performs subsequent recovery operations after the elapsed duration of twenty four hours based on a frequency that decreases exponentially after performance of prior recovery operations.

It should be noted that SLA 305 (or a user input) can also indicate a total elapsed time (e.g., total elapsed time 335) that refers to the maximum amount of time during which recovery operations can be performed. Therefore, because the total elapsed time associated with node group 301(1) is seventy two hours, recovery module 125 performs recovery operations based on a specific minimum frequency of one hour indicated by the ACRT until the elapsed time of failure is equal to the MTTR (e.g., for the first twenty four hours). Between twenty four hours and seventy hours of elapsed time of failure, recovery module 125 performs recovery operations based on a frequency that decreases exponentially after performance of prior recovery operations (e.g., a time period between each recovery operation increases exponentially after elapsed time reaches the MTTR). After the elapsed time reaches (or is equal to) the total elapsed time (e.g., seventy two hours), recovery module 125 ceases performance of all recovery operations and designates the node(s) in question as unrecoverable, and/or flags the node(s) for manual recovery (e.g., by an administrator and/or IT professional).

Example Processes of Performing Recovery Operations in Unmanaged Clusters

Figure 4:
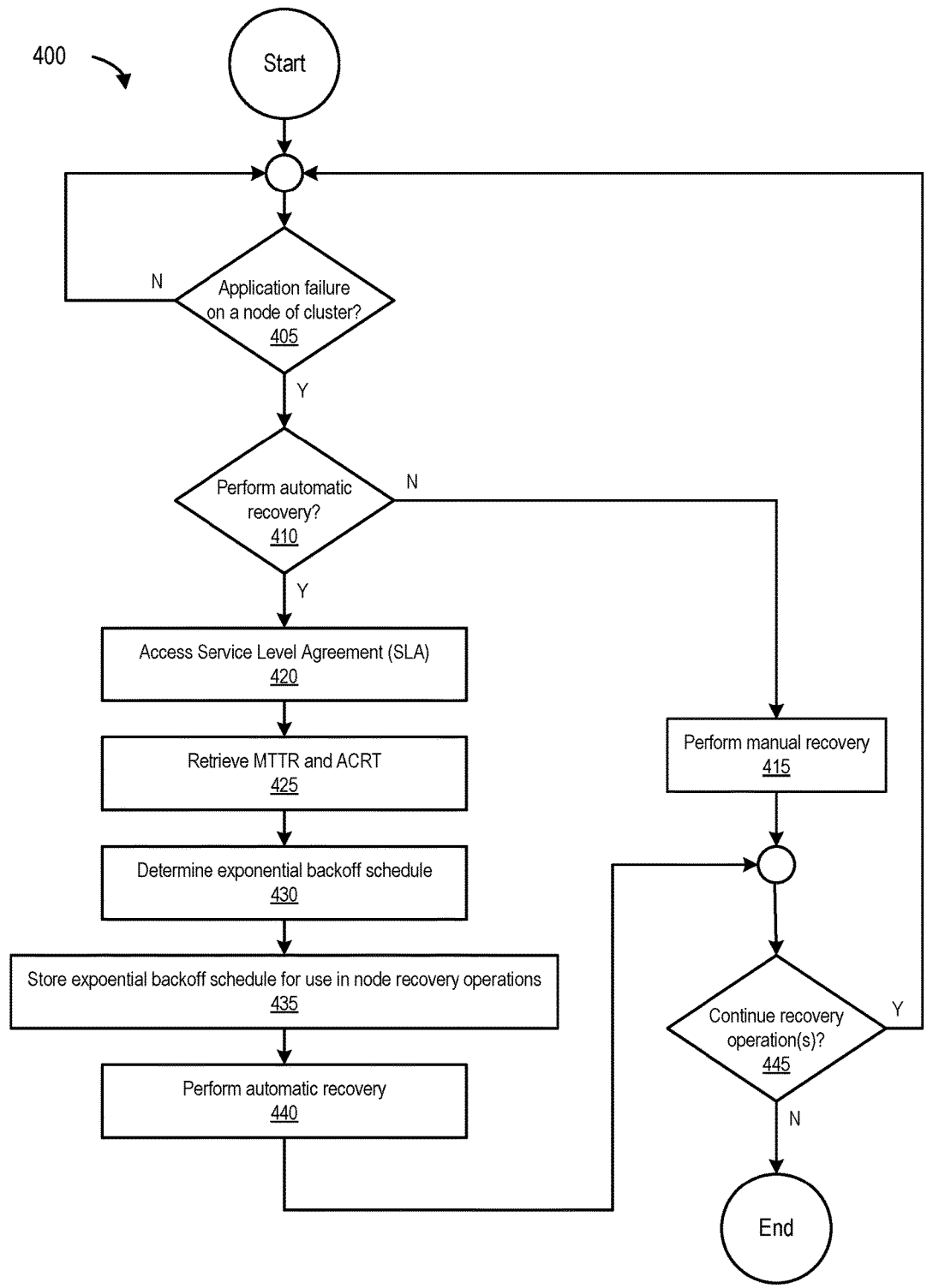
FIG. 4 is a flowchart that illustrates a process for performing automatic recovery operations, according to one embodiment of the present disclosure.

FIG. 4 is a flowchart that illustrates a process for performing automatic recovery operations, according to one embodiment. The process begins at 405 by determining whether there is an application failure on a node of a cluster (e.g., whether application 115 has failed on node 110(1) in cluster 105). If an application failure is detected on a node of a cluster, the process, at 410, determines whether automatic recovery should be performed. If automatic recovery is not required, at 415, the process performs manual recovery and ends at 445 by determining whether recovery operations should continue (e.g., to recover other failed nodes, if any, in a node group).

However, if automatic recovery should be performed, the process, at 420, access an SLA (e.g., SLA 305). At 425, the process receives an MTTR (e.g., four hours) and an ACRT (e.g., ten minutes) associated with a particular failed node (e.g., node 110(1)). It should be noted that the process can update, change, and/or modify the received MTTR and ACRT based on one or more factors described above. For example, and in some embodiments, the process can even recalculate the MTTR and the ACRT based on historical information of node failure, a new user input, an updated SLA, and the like.

At 430, the process determines the exponential backoff schedule, and at 435, stores the exponential backoff schedule for use in node recovery operations. At 440, the process performs automatic recovery. For example, the process determines the exponential backoff frequency of recovery operations after the elapsed time of node failure reaches the particular failed node's MTTR. Prior to this time, the process performs recovery operations based on the ACRT. However, once the elapsed time is equal to the MTTR, the process performs subsequent recovery operations (e.g., until the elapsed time is equal to the total elapsed time), based on a frequency that decreases exponentially after performance of prior recovery operations.

For example, if the ACRT associated with a particular failed node is ten minutes and the MTTR associated with the particular failed node is four hours, the process performs recovery operations on the particular failed node every ten minutes (e.g., after an initial delay to account for transient and/or minor faults). However, because the MTTR associated with this particular failed node is four hours, after the elapsed time of failure reaches four hours, the process performs subsequent recovery operations based on a frequency that decreases exponentially (after performance of previous/prior recovery operations). Therefore, after four hours, the process performs recovery operations based on an exponential backoff schedule (e.g., 20 minutes, 40 minutes, 80 minutes, etc.), instead of every ten minutes. The process ends at 445 by determining whether automatic recovery operations should continue (e.g., whether the elapsed time of failure equals total elapsed time).

Figure 5:
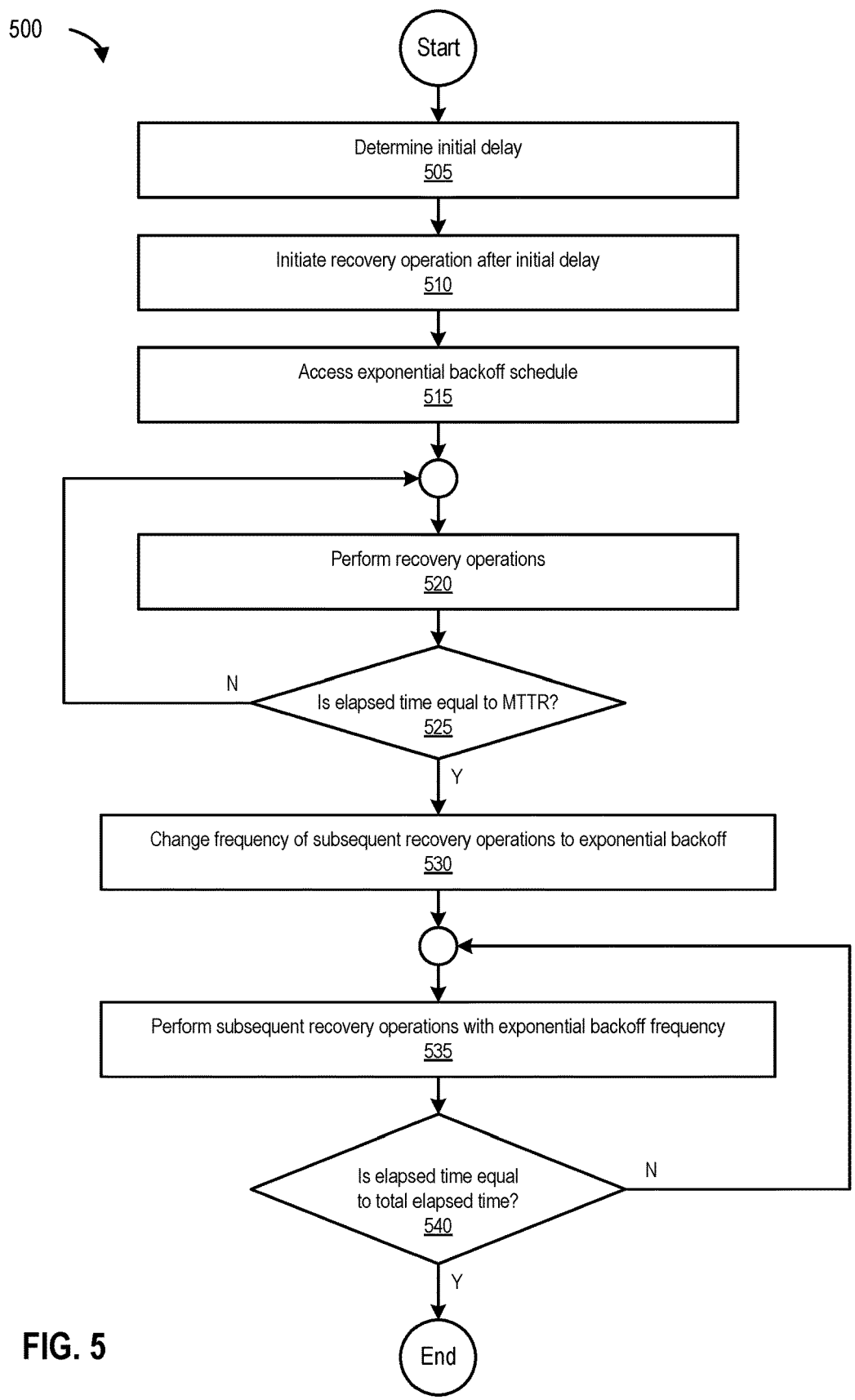
FIG. 5 is a flowchart that illustrates a process for performing recovery operations with exponential backoff, according to one embodiment of the present disclosure.

FIG. 5 is a flowchart that illustrates a process for performing recovery operations with exponential backoff, according to one embodiment. The process begins at 505 by determining an initial delay. As previously noted, a node can fail as the result of a transient and/or minor fault that can be automatically corrected and/or fixed by the cluster in a short amount of time. Therefore, the process first determines an initial delay. At 510, the process initiates recovery operations after the initial delay.

At 515, the process accesses an exponential backoff schedule. The exponential backoff schedule includes the exponential backoff frequency for recovery operations. At 520, the process performs recovery operations based on the exponential backoff schedule. At 525, the process determines if the elapsed time (of node failure) is equal to the MTTR. If the elapsed time is equal to the MTTR, the process changes the frequency of subsequent recovery operations to the exponential backoff frequency. The process ends at 540 by determining if the elapsed time (of node failure) is equal to the total elapsed time. If the elapsed time is equal to the total elapsed time the process ceases performance of recovery operations.

Figure 6:
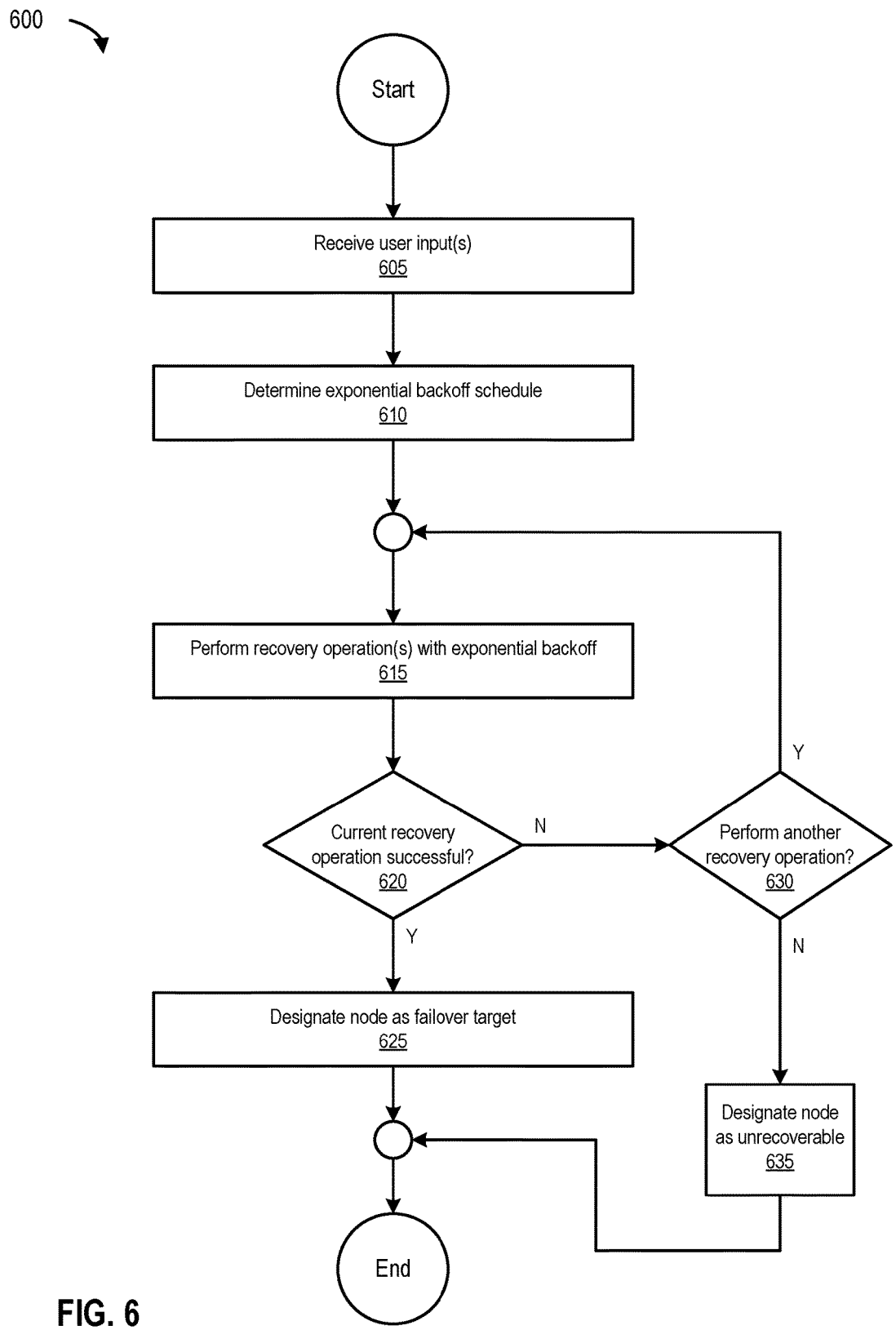
FIG. 6 is a flowchart that illustrates a process for designating a node as a failover target, according to one embodiment of the present disclosure.

FIG. 6 is a flowchart that illustrates a process for designating a node as a failover target, according to one embodiment. The process begins at 605 by receiving one or more user inputs. In one embodiment, the user inputs include ACRT and MTTR information for one or more nodes. The process, at 610, determines the exponential backoff schedule based on the received user inputs. At 615, the process performs recovery operation(s) with exponential backoff (e.g., based on an exponential backoff frequency). At 620, the process determines whether the current recovery operation is successful (e.g., whether the node in question has recovered). If the current recovery operation is successful, the process ends at 625 by designating the node as a failover target.

However, if the current recovery operation is unsuccessful, the process, at 630, determines whether another recovery operation must be performed. If another recovery operation is to be performed (e.g., the elapsed time of failure is less than the total elapsed time), the process continues performing recovery operations with exponential backoff. However, if another recovery operation should not be performed (e.g., node requires human intervention for recovery, elapsed time of failure is equal to total elapsed time, and the like), the process ends at 635 by designating the node as unrecoverable.

Figure 7:
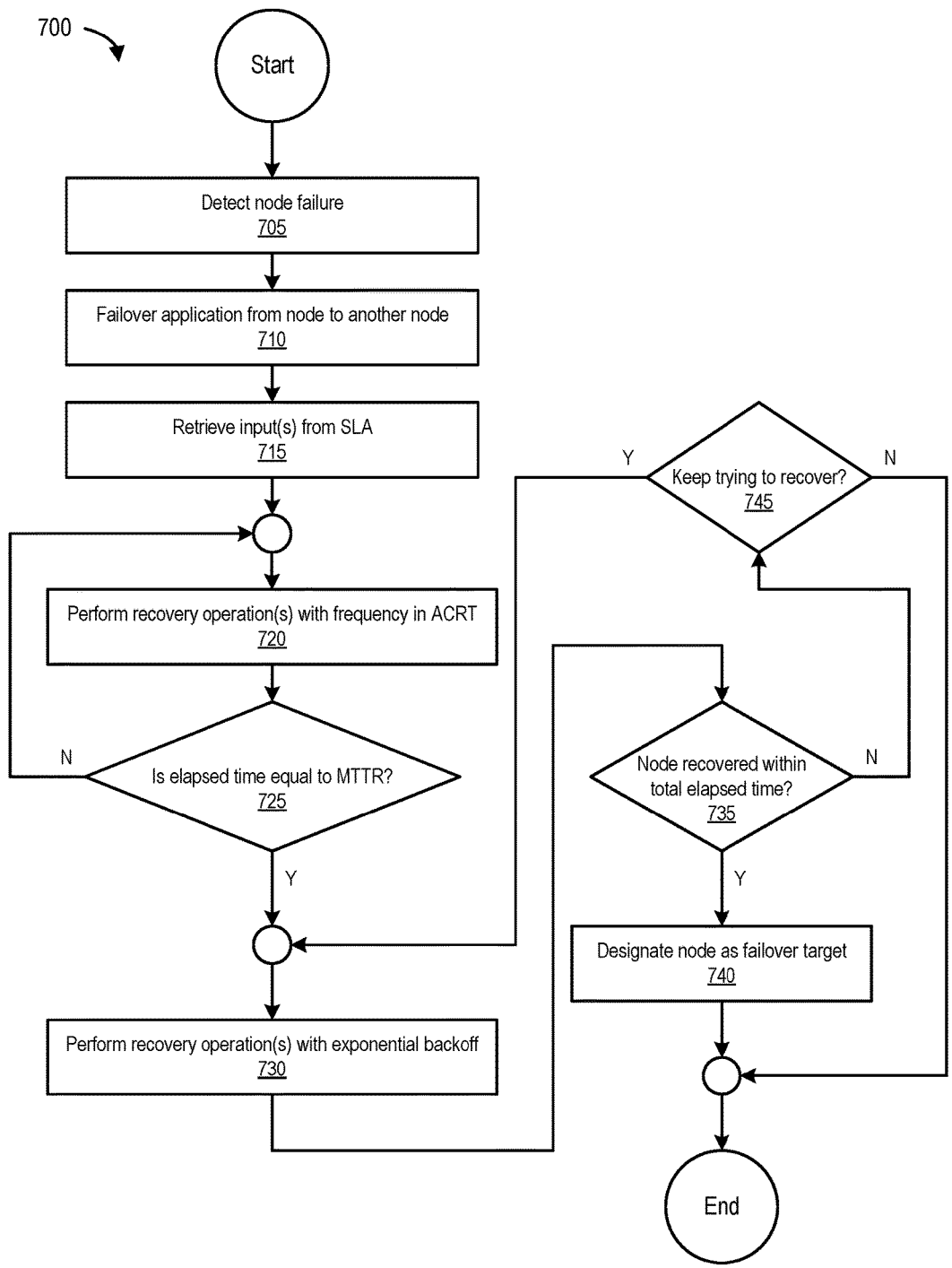
FIG. 7 is a flowchart that illustrates a process for performing recovery operations with exponential backoff, according to one embodiment of the present disclosure.

FIG. 7 is a flowchart that illustrates a process for performing recovery operations with exponential backoff, according to one embodiment. The process begins at 705 by detecting a node failure. At 710, the process fails over an application from the failed node to another node (e.g., in the cluster). At 715, the process receives one or more inputs from an SLA. At 720, the process performs automatic recovery operations with frequency in the ACRT (e.g., the specific minimum frequency).

At 725, the process determines whether the elapsed time is equal to the MTTR. If the elapsed time is equal to the MTTR, the process, at 730, performs recovery operations with exponential backoff (e.g., based on an exponential backoff frequency). At 735, the process determines whether the node in question has recovered within the total elapsed time. If the node has not recovered within the total elapsed time, the process, at 745 determines whether further recovery operations should be performed. However, if the node has recovered within the total elapsed time, the process ends at 740 by designating the node as a failover target.

An Example Computing Environment

Figure 8:
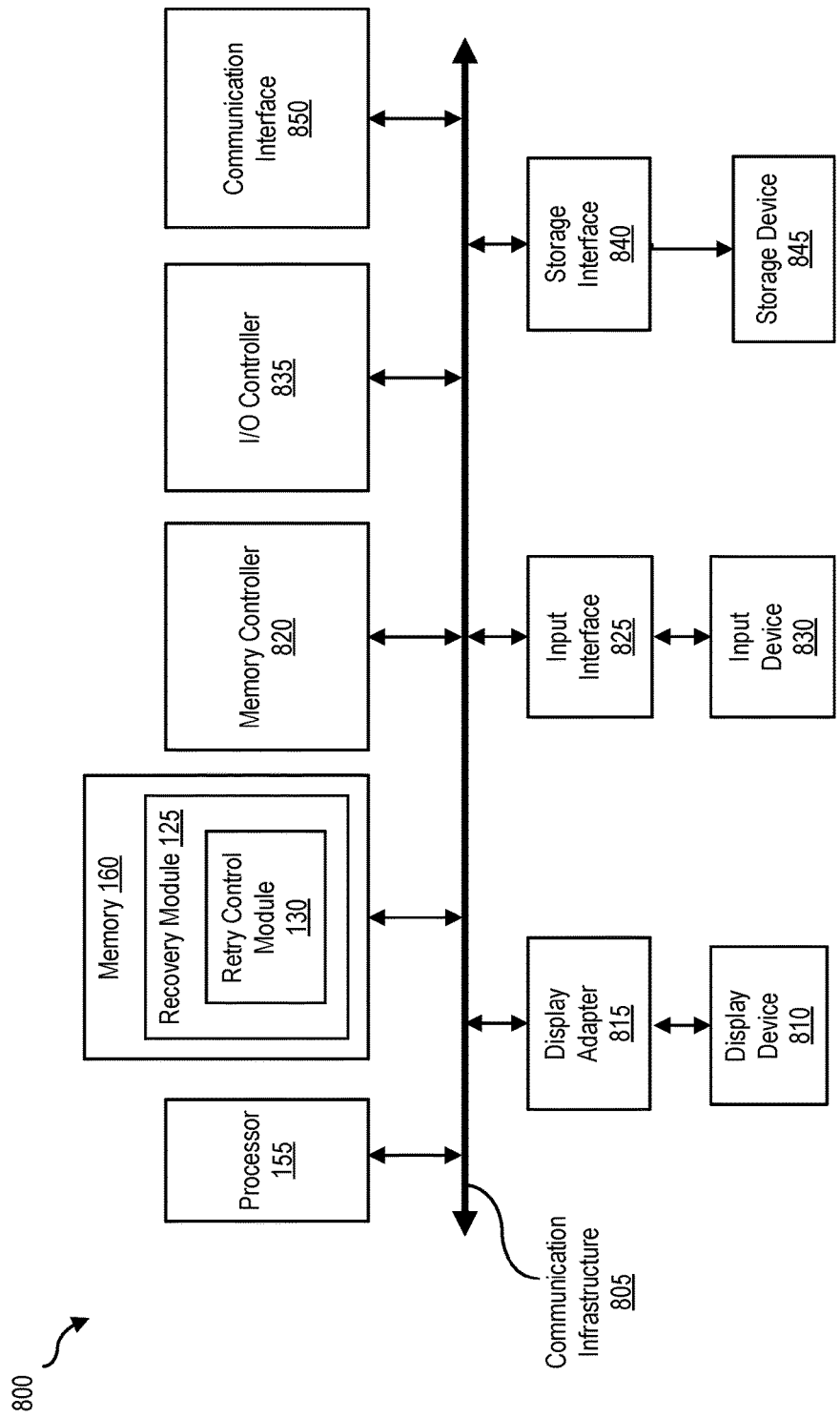
FIG. 8 is a block diagram of a computing system, illustrating how a recovery module can be implemented in software, according to one embodiment of the present disclosure.

FIG. 8 is a block diagram of a computing system, illustrating how a recovery module can be implemented in software, according to one embodiment of the present disclosure. Computing system 800 broadly represents any single or multi-processor computing device or system capable of executing computer-readable instructions. Examples of computing system 800 include, without limitation, any one or more of a variety of devices including workstations, personal computers, laptops, client-side terminals, servers, distributed computing systems, handheld devices, network appliances, storage controllers, and the like. Computing system 800 may include at least one processor 155 and a memory 160. By executing the software that implements cluster management server 150 and/or nodes 110(1)-(N), computing system 800 becomes a special purpose computing device that is configured to perform recovery operations based on an exponential backoff frequency.

Processor 155 generally represents any type or form of processing unit capable of processing data or interpreting and executing instructions. In certain embodiments, processor 155 may receive instructions from a software application or module. These instructions may cause processor 155 to perform the functions of one or more of the embodiments described and/or illustrated herein. For example, processor 155 may perform and/or be a means for performing all or some of the operations described herein. Processor 155 may also perform and/or be a means for performing any other operations, methods, or processes described and/or illustrated herein.

Memory 160 generally represents any type or form of volatile or non-volatile storage device or medium capable of storing data and/or other computer-readable instructions. Examples include, without limitation, random access memory (RAM), read only memory (ROM), flash memory, or any other suitable memory device. Although not required, in certain embodiments computing system 800 may include both a volatile memory unit and a non-volatile storage device. In one example, program instructions implementing a recovery module 125 and/or a retry control module 130 may be loaded into memory 160.

In certain embodiments, computing system 800 may also include one or more components or elements in addition to processor 155 and memory 160. For example, as illustrated in FIG. 8, computing system 800 may include a memory controller 820, an Input/Output (I/O) controller 835, and a communication interface 850, each of which may be interconnected via a communication infrastructure 805. Communication infrastructure 805 generally represents any type or form of infrastructure capable of facilitating communication between one or more components of a computing device. Examples of communication infrastructure 805 include, without limitation, a communication bus (e.g., Industry Standard Architecture (ISA), Peripheral Component Interconnect (PCI), PCI express (PCIe), or similar bus) and a network.

Memory controller 820 generally represents any type or form of device capable of handling memory or data or controlling communication between one or more components of computing system 800. For example, in certain embodiments memory controller 820 may control communication between processor 155, memory 160, and I/O controller 835 via communication infrastructure 805. In certain embodiments, memory controller 820 may perform and/or be a means for performing, either alone or in combination with other elements, one or more of the operations or features described and/or illustrated herein.

I/O controller 835 generally represents any type or form of module capable of coordinating and/or controlling the input and output functions of a computing device. For example, I/O controller 835 may control or facilitate transfer of data between one or more elements of computing system 800, such as processor 155, memory 860, communication interface 850, display adapter 815, input interface 825, and storage interface 840.

Communication interface 850 broadly represents any type or form of communication device or adapter capable of facilitating communication between computing system 800 and one or more additional devices. For example, in certain embodiments communication interface 850 may facilitate communication between computing system 8900 and a private or public network including additional computing systems. Examples of communication interface 850 include, without limitation, a wired network interface (such as a network interface card), a wireless network interface (such as a wireless network interface card), a modem, and any other suitable interface. In at least one embodiment, communication interface 850 may provide a direct connection to a remote server via a direct link to a network, such as the Internet. Communication interface 850 may also indirectly provide such a connection through, for example, a local area network (such as an Ethernet network), a personal area network, a telephone or cable network, a cellular telephone connection, a satellite data connection, or any other suitable connection.

In some embodiments, communication interface 850 may also represent a host adapter configured to facilitate communication between computing system 800 and one or more additional network or storage devices via an external bus or communications channel. Examples of host adapters include, without limitation, Small Computer System Interface (SCSI) host adapters, Universal Serial Bus (USB) host adapters, Institute of Electrical and Electronics Engineers (IEEE) 1394 host adapters, Serial Advanced Technology Attachment (SATA), Serial Attached SCSI (SAS), and external SATA (eSATA) host adapters, Advanced Technology Attachment (ATA) and Parallel ATA (PATA) host adapters, Fibre Channel interface adapters, Ethernet adapters, or the like. Communication interface 850 may also allow computing system 800 to engage in distributed or remote computing. Communication interface 850 may receive instructions from a remote device or send instructions to a remote device for execution.

As illustrated in FIG. 8, computing system 800 may also include at least one display device 810 coupled to communication infrastructure 805 via a display adapter 815. Display device 810 generally represents any type or form of device capable of visually displaying information forwarded by display adapter 815. Similarly, display adapter 815 generally represents any type or form of device configured to forward graphics, text, and other data from communication infrastructure 805 (or from a frame buffer, as known in the art) for display on display device 810.

As illustrated in FIG. 8, computing system 800 may also include at least one input device 830 coupled to communication infrastructure 805 via an input interface 825. Input device 830 generally represents any type or form of input device capable of providing input, either computer or human generated, to computing system 800. Examples of input device 830 include, without limitation, a keyboard, a pointing device, a speech recognition device, or any other input device.

As illustrated in FIG. 8, computing system 800 may also include storage device 845 coupled to communication infrastructure 805 via a storage interface 840. Storage device 845 generally represents any type or form of storage devices or mediums capable of storing data and/or other computer-readable instructions. For example, storage device 845 may include a magnetic disk drive (e.g., a so-called hard drive), a floppy disk drive, a magnetic tape drive, an optical disk drive, a flash drive, or the like. Storage interface 840 generally represents any type or form of interface or device for transferring and/or transmitting data between storage device 845, and other components of computing system 800.

In certain embodiments, storage device 845 may be configured to read from and/or write to a removable storage unit configured to store computer software, data, or other computer-readable information. Examples of suitable removable storage units include, without limitation, a floppy disk, a magnetic tape, an optical disk, a flash memory device, or the like. Storage device 845 may also include other similar structures or devices for allowing computer software, data, or other computer-readable instructions to be loaded into computing system 800. For example, storage device 845 may be configured to read and write software, data, or other computer-readable information. Storage device 845 may also be a part of computing system 800 or may be separate devices accessed through other interface systems.

Many other devices or subsystems may be connected to computing system 800. Conversely, all of the components and devices illustrated in FIG. 8 need not be present to practice the embodiments described and/or illustrated herein. The devices and subsystems referenced above may also be interconnected in different ways from that shown in FIG. 8.

Computing system 800 may also employ any number of software, firmware, and/or hardware configurations. For example, one or more of the embodiments disclosed herein may be encoded as a computer program (also referred to as computer software, software applications, computer-readable instructions, or computer control logic) on a computer-readable storage medium. Examples of computer-readable storage media include magnetic-storage media (e.g., hard disk drives and floppy disks), optical-storage media (e.g., CD- or DVD-ROMs), electronic-storage media (e.g., solid-state drives and flash media), and the like. Such computer programs can also be transferred to computing system 800 for storage in memory via a network such as the Internet or upon a carrier medium.

The computer-readable medium containing the computer program may be loaded into computing system 800. All or a portion of the computer program stored on the computer-readable medium may then be stored in memory 160 and/or various portions of storage device 845. When executed by processor 155, a computer program loaded into computing system 800 may cause processor 155 to perform and/or be a means for performing the functions of one or more of the embodiments described and/or illustrated herein. Additionally or alternatively, one or more of the embodiments described and/or illustrated herein may be implemented in firmware and/or hardware. For example, computing system 800 may be configured as an application specific integrated circuit (ASIC) adapted to implement one or more of the embodiments disclosed herein.

An Example Networking Environment

Figure 9:
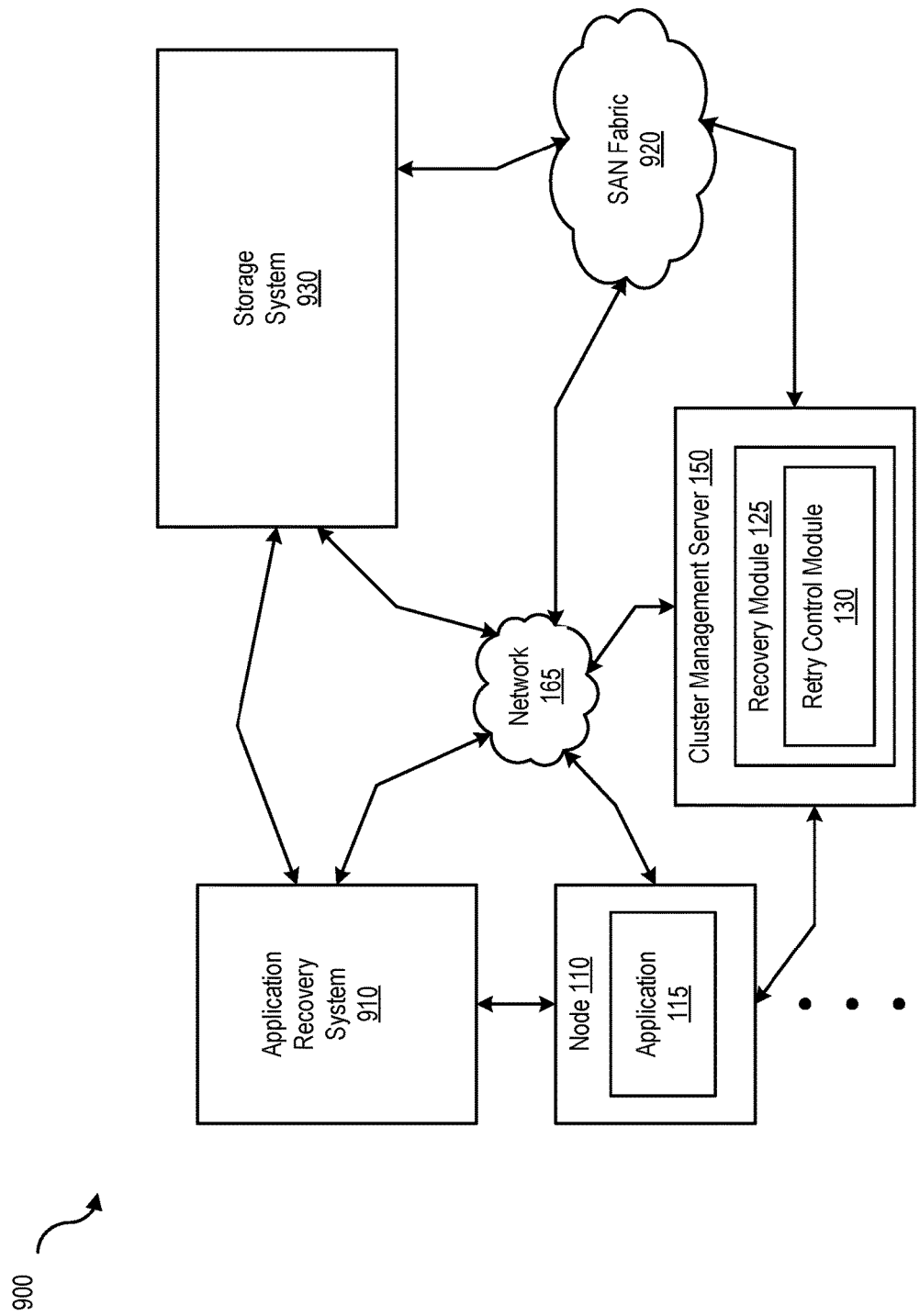
FIG. 9 is a block diagram of a networked system, illustrating how various computing devices can communicate via a network, according to one embodiment of the present disclosure.

FIG. 9 is a block diagram of a networked system, illustrating how various computing devices can communicate via a network, according to one embodiment of the present disclosure. In certain embodiments, network-attached storage (NAS) devices may be configured to communicate with cluster management server 150 and/or nodes 110(1)-(N) using various protocols, such as Network File System (NFS), Server Message Block (SMB), or Common Internet File System (CIFS).

Network 165 generally represents any type or form of computer network or architecture capable of facilitating communication between multiple computing devices. Network 165 may facilitate communication between cluster management server 150 and/or nodes 110(1)-(N). In certain embodiments, and with reference to computing system 800 of FIG. 8, a communication interface, such as communication interface 850 in FIG. 8, may be used to provide connectivity between cluster management server 150, nodes 110(1)-(N) and network 165. It should be noted that the embodiments described and/or illustrated herein are not limited to the Internet or any particular network-based environment. For example, network 165 can be a Storage Area Network (SAN).

In at least one embodiment, all or a portion of one or more of the embodiments disclosed herein may be encoded as a computer program and loaded onto and executed by cluster management server 150 and/or nodes 110(1)-(N), or any combination thereof. In addition, all or a portion of one or more of the embodiments disclosed herein may also be encoded as a computer program, stored on cluster management server 150 and/or nodes 110(1)-(N), and distributed over network 165.

In some examples, all or a portion of the computing devices in FIGS. 1A, 1B, and 1C may represent portions of a cloud-computing or network-based environment. Cloud-computing environments may provide various services and applications via the Internet. These cloud-based services (e.g., software as a service, platform as a service, infrastructure as a service, etc.) may be accessible through a web browser or other remote interface. Various functions described herein may be provided through a remote desktop environment or any other cloud-based computing environment.

In addition, one or more of the components described herein may transform data, physical devices, and/or representations of physical devices from one form to another. For example, cluster management server 150 and/or nodes 110(1)-(N) may transform behavior of a computing device, cluster, and/or server in order to cause the computing device, cluster, and/or server to perform recovery operations based on exponential backoff.

Although the present disclosure has been described in connection with several embodiments, the disclosure is not intended to be limited to the specific forms set forth herein. On the contrary, it is intended to cover such alternatives, modifications, and equivalents as can be reasonably included within the scope of the disclosure as defined by the appended claims.

What is claimed is:

1. A computer-implemented method, comprising:
    determining a mean time to recovery (MTTR) and an auto-clear retry threshold (ACRT) of a node based on one or more characteristics of the node, wherein
        the MTTR comprises a mean time required to recover the node failure, and
        the ACRT comprises a frequency at which a plurality of recovery operations are to be performed;
    detecting failure of the node, wherein
        the node is one of a plurality of nodes comprised in a cluster, and
        in response to the node failure, an application executing on the node is failed over to another node in the cluster; and
    in response to the detecting the node failure, performing the plurality of recovery operations to determine whether the node is recovered based on the ACRT until an elapsed time since the node failure is equal to the MTTR, wherein
        a subsequent recovery operation of the plurality of recovery operations is performed after a prior recovery operation of the plurality of recovery operations, and
        the subsequent recovery operation is performed periodically based on the frequency that decreases exponentially after performing the prior recovery operation.

2. The computer-implemented method of claim 1, wherein
    a time period between each recovery operation of the plurality of recovery operations increases exponentially after the elapsed time reaches the MTTR.

3. The method of claim 2, wherein
    one or more recovery operation of the plurality of recovery operations are performed based on the ACRT until the elapsed time is equal to the MTTR.

4. The method of claim 3, further comprising
    if the MTTR and the ACRT cannot be determined based on one or more node characteristics, receiving the MTTR and the ACRT as part of one or more user inputs, or one or more Service Level Agreements (SLAs).

5. The method of claim 2, wherein
    the MTTR comprises information indicating the mean time required to recover the node failure such that the node can be designated as a failover target for the application.

6. The method of claim 3, wherein
    the ACRT comprises information indicating a specific minimum frequency at which each subsequent recovery operation of the plurality of recovery operations is to be performed until the elapsed time is equal to the MTTR.

7. The method of claim 1, wherein
    the cluster is an unmanaged cluster.

8. The method of claim 1, wherein
    the cluster is a minimally managed cluster.

9. The method of claim 2, wherein
    the MTTR is based on the one or more characteristics of the cluster comprising
        a geographic location of the cluster,
        a size of the cluster, or
        complexity of the application.

10. A non-transitory computer readable storage medium storing program instructions executable to:
    determine a mean time to recovery (MTTR) and an auto-clear retry threshold (ACRT) of a node based on one or more characteristics of the node, wherein
        the MTTR comprises a mean time required to recover the node failure, and
        the ACRT comprises a frequency at which a plurality of recovery operations are to be performed;
    detect failure of the node, wherein
        the node is one of a plurality of nodes comprised in a cluster, and
        in response to the node failure, an application executing on the node is failed over to another node in the cluster; and
    in response to the detecting the node failure, perform the plurality of recovery operations to determine whether the node is recovered based on the ACRT until an elapsed time since the node failure is equal to the MTTR, wherein
        a subsequent recovery operation of the plurality of recovery operations is performed after a prior recovery operation of the plurality of recovery operations, and
        the subsequent recovery operation is performed periodically based on the frequency that decreases exponentially after performing the prior recovery operation.

11. The non-transitory computer readable storage medium of claim 10, wherein
    a time period between each recovery operation of the plurality of recovery operations increases exponentially after the elapsed time reaches the MTTR and
    one or more recovery operation of the plurality of recovery operations are performed based on the ACRT until the elapsed time is equal to the MTTR.

12. The non-transitory computer readable storage medium of claim 11, further comprising
    if the MTTR and the ACRT cannot be determined based on one or more node characteristics, receiving the MTTR and the ACRT as part of one or more user inputs, or one or more Service Level Agreements (SLAs).

13. The non-transitory computer readable storage medium of claim 12, wherein
    the MTTR comprises information indicating the mean time required to recover the node failure such that the node can be designated as a failover target for the application, and
    the ACRT comprises information indicating a specific minimum frequency at which each subsequent recovery operation of the plurality of recovery operations is to be performed until the elapsed time is equal to the MTTR.

14. The non-transitory computer readable storage medium of claim 10, wherein the cluster is
    an unmanaged cluster, or
    a minimally managed cluster.

15. The non-transitory computer readable storage medium of claim 11, wherein
    the MTTR is based on one or more characteristics of the cluster comprising
        a geographic location of the cluster,
        a size of the cluster,
        complexity of the application.

16. A system comprising:
one or more processors; and
a memory coupled to the one or more processors, wherein the memory stores program instructions executable by the one or more processors to:
determine a mean time to recovery (MTTR) and an auto-clear retry threshold (ACRT) of a node based on one or more characteristics of the node; wherein
the MTTR comprises a mean time required to recover the node failure, and
the ACRT comprises a frequency at which a plurality of recovery operations are to be performed;
detect failure of the node, wherein
the node is one of a plurality of nodes comprised in a cluster, and
in response to the node failure, an application executing on the node is failed over to another node in the cluster; and
in response to the detecting the node failure, perform the plurality of recovery operations to determine whether the node is recovered based on the ACRT until an elapsed time since the node failure is equal to the MTTR, wherein
a subsequent recovery operation of the plurality of recovery operations is performed after a prior recovery operation of the plurality of recovery operations, and
the subsequent recovery operation is performed periodically based on the frequency that decreases exponentially after performing the prior recovery operation.

17. The system of claim 16, wherein
a time period between each recovery operation of the plurality of recovery operations increases exponentially after the elapsed time reaches the MTTR, and
one or more recovery operation of the plurality of recovery operations are performed based on the ACRT until the elapsed time is equal to the MTTR.

18. The system of claim 17, wherein
if the MTTR and the ACRT cannot be determined based on one or more node characteristics, receiving the MTTR and the ACRT as part of one or more user inputs, or one or more Service Level Agreements (SLAs),
the MTTR comprises information indicating a mean time required to recover the node failure such that the node can be designated as a failover target for the application, and
the ACRT comprises information indicating a specific minimum frequency at which each recovery operation of the plurality of recovery operations is to be performed until the elapsed time is equal to the MTTR.

19. The system of claim 16, wherein
the cluster is
an unmanaged cluster, or
a minimally managed cluster.

20. The system of claim 17, wherein
the MTTR is based on one or more characteristics of the cluster comprising
a geographic location of the cluster,
a size of the cluster, or
complexity of the application.

* * * * *